United States Patent Office 2,731,425
Patented Jan. 17, 1956

2,731,425

ELECTRICALLY CONDUCTIVE MEMBRANES AND THE LIKE COMPRISING CONDENSATION POLYMERS CONTAINING POLYALKYLENE POLYAMINES

Walter Juda, Lexington, and Andrew A. Kasper, Watertown, Mass., assignors to Ionics, Incorporated, Cambridge, Mass., a corporation of Massachusetts No Drawing. Application April 11, 1951,
Serial No. 220,544

10 Claims. (Cl. 260—2.1)

This invention relates to electrically conductive solid materials having ionic selectivity and substantial anion exchange capacity and in particular to hydrous synthetic organic electrolytic polymers which are condensation products of methylol-forming phenols, aldehydes and polyalkylene polyamines, and methods of preparing them.

Until recently solid materials, particularly synthetic organic resins, having substantial ion exchange capacity were obtainable only in particulate form, such as granules or beads. The copending application of Walter Juda and Wayne A. McRae, Serial No. 103,784, filed July 9, 1949, now Patent No. 2,636,851, issued April 28, 1953, describes synthetic polymeric materials in the form of hydrous gels which may be formed into such large-dimensioned structures as membranes, tubes, rods, vessels and the like. These materials, like ion-exchange resins, include in their polymeric structure dissociable ionizable radicals, one ionic component of which is fixed into or retained by the polymeric matrix and at least one component of which consists of a mobile and replaceable ion electrostatically associated with the fixed component. The ability of the mobile ion to be replaced, under appropriate concentration conditions, by ions of the same charge imparts ion exchange characteristics to these materials.

More important, however, is the effect the fixed radicals have on the electro-conductive properties of these materials. The fixed ions possess electrostatic charges attractive to the mobile ions and other ions of like charge, and which tend to repel ions of the opposite charge, that is, ions of the same charge as the fixed ions. Under the influence of an electric field, ions charged like the mobile ions may be caused to permeate the material exclusively of ions of the opposite charge, which are repelled. These materials are accordingly electrically conductive and selectively permeable.

The present invention comprises polymeric solid material of the general characteristics of those described by Juda and McRae, and provides coherent homogeneous solids which are highly conductive and selectively permeable to anions and which also have substantial anion exchange capacity. It is further a feature of the materials of this invention that they are mechanically durable, so that they may be formed into self-sustaining structures, and are substantially hydraulically impermeable under ordinary pressure differentials, so that they may be used effectively as hydraulic separators. These materials may be used in dialysis and electrodialysis apparatus where advantage may be taken of their selectively permeable and highly conductive properties. Several such arrangements are described in the above-identified application of Juda and McRae.

According to the process of this invention, a methylolforming phenol, an aldehyde, and an alkylene polyamine are caused to condense under acid conditions while maintained in an aqueous dispersion under conditions which prevent substantial evaporation of water. Condensation is effected by any of the well known expedients, as, for instance, by heat, pressure or catalytic accelerators, and is continued until a water insoluble, infusible hydrous gel is formed. The resultant product is a salt form of the dissociable polymer.

By maintaining aqueous dispersion conditions throughout the polymerization (condensation), there results a solid gel containing a continuous water phase which retains the form of the dispersed mass, and which is furthermore a coherent and homogeneous structure. The presence of the water phase appears to be effective in orienting the basic amine groups in a dissociable position and provides a medium in which dissociation may occur, resulting in a solid structure which is electrically conductive and selectively permeable to anions.

It has been found that in order to attain these desirable characteristics, the water should be present in the dispersion in an amount of at least 30 per cent by weight based on the weight of condensed solid material after drying to constant weight at 105° C., and should not at any time, either during the condensation or afterwards, be reduced. Permitting the water content to become lower is likely to cause cracking and impairment of the electrical properties of the material. Although a minimum water content of 30 per cent has been found effective for the purposes of this invention, preferred embodiments include much larger amounts, between 100 and 200 per cent, and may include such larger amounts as do not interfere with the physical structure of the solid. Structures including as much as 300 per cent water have been found entirely satisfactory.

The ordinary curing conditions, previously used, in which water is allowed to escape or evaporate, do not result in the formation of continuous coherent and homogeneous structures which are selectively permeable and electrically conductive. Either a continuous resinous dielectric structure results, as is typified by the well known phenolic molding resins, or a fractured or particulate structure results which is typified by the granular ion-exchange resins.

The products produced in accordance with this invention have been found to have high electrical conductivities, generally in excess of $5 \times 10^{-3}$ ohm$^{-1}$ cm.$^{-1}$. They are substantially selectively permeable to anions as indicated by the fact that in the standard concentration cell

| calomel electrode | sat'd KCl bridge | 0.1 N KCl | membrane | 0.01 N KCl | sat'd KCl bridge | calomel electrode |
|---|---|---|---|---|---|---| at 25° C., a characteristic concentration potential approaching the thermodynamic ideal of 55.1 millivolts may be measured. The ion exchange capacity of these materials is in excess of 0.3 milliequivalents per gram of solid material after drying to constant weight at 105° C., and they possess hydraulic resistivities in excess of $10^2$ atm. sec. cm.$^{-2}$ (the pressure in atmospheres required to cause liquid to permeate a centimeter cube of the material at the rate of one cubic centimeter per second).

Structures may be formed in accordance with this invention by casting or molding (including pressure molding) the aqueous acid dispersion of polymerizable ingredients and causing polymerization in the mold while preventing the evaporation or escape of substantial amounts of water, for instance, by closing the mold or by otherwise carrying out the polymerization under substantially saturated aqueous conditions. In this way forms and structures may be obtained in any desired shape or size, including structures having at least one and preferably two dimensions greater than ¼ inch, and which are accordingly far greater in size than structures in which conventional ion exchange materials have been made in the past. Such cast or molded structures may, if desired, be further formed as by machining or grinding.

The methylol-forming phenol which constitutes one of the ingredients of the product of this invention may be any phenolic material having two or three hydrogen atoms which are susceptible to methylol formation. Methylol formation occurs when a phenol having a hydrogen atom in the ortho or para position with respect to a hydroxyl group and which is not otherwise deactivated, as by the influence of other groups, is caused to react with formaldehyde. As an example, in the reaction between phenol and formaldehyde, the first reaction products are ortho and para hydroxybenzyl alcohol

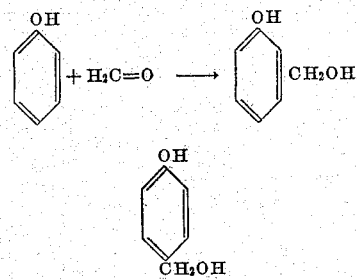

and which contain the methylol group, CH₂OH. The preferred methylol-forming phenols are resorcinol, pyrogallol, pyrocatechol, hydroquinone, phloroglucinol, and the reaction product of 2 mols of phenol and one of acetone, 2,2 bis-(parahydroxy phenyl) propane, as well as other equivalent compounds. Phenol itself may also be used, although it results in a reaction which is more difficult to control. Mixtures of phenols are often advantageous.

The aldehydes which may be used include all those which can be caused to co-condense with methylol-forming phenols, including formaldehyde, acetaldehyde, furfural and the like. Formaldehyde is preferred because of the short cross links which it forms on condensation. It may be used in its gaseous form, but it is far more convenient to use its aqueous solution or materials which are readily decomposible to formaldehyde, such as paraformaldehyde, metaformaldehyde, hexamethylene tetramine and the like.

The alkylene polyamines are those materials having the general structure

where R represents alkylene groups and $x$ represents an integer or zero. Preferred materials are ethylene diamine and the polyethylene polyamines such as diethylene triamine, triethylene tetramine and tetraethylene pentamine. The corresponding propyl and butyl compounds are believed to be satisfactory equivalents.

Desirable acid conditions are provided by adding an inorganic acid, preferably hydrochloric, to the mixture prior to the final curing. Preferred products are accordingly the hydrochloride salts of the dissociable polymer. It will be understood from the foregoing that these polymers may be converted to the salt or to the basic form by conventional ion-exchange techniques.

The proportions in which the ingredients should be combined are most accurately described in molar quantities. The amount of amine is specified in terms of the number of mols of amino groups, that is, the number of mols of the amine times the number of amino groups per molecule. Preferably there are employed from 1.0 to 2.0 amino group mols per mol of phenol, and an amount of aldehyde of from 1.2 to 1.8 times the number of mols of phenol plus from 0.4 to 1.0 times the number of mols of amino groups. Acid is added to give an acidity equivalent to that provided by the addition of from 0.5 to 1.0 mol of hydrochloric acid per amino group mol.

Combinations outside these proportions may be used to produce large dimensioned structures according to this invention, but with some sacrifice of some of the desirable characteristics. For instance, the ratio of amino groups to phenol may be expanded to from 0.2 to 6.0, and beyond, but lower conductivity results when lesser amine than recommended is used and mechanical stability is sacrificed when more is used. Lesser amounts of aldehyde result in products having lower mechanical stability, but which are not useless. The acid is believed to be helpful in producing products which are in an easily dissociated salt form, and its presence helps to control the condensation reaction.

The ingredients should be combined to form an aqueous dispersion, either by adding them to water or by mixing an aqueous solution of one or more with the others. In one preferred method part of the aldehyde, generally less than half of the total amount, is added as an aqueous solution to the amine, then the acid is added, and subsequently, preferably after cooling the mixture, the phenol is added. After the addition of the phenol the temperature is allowed to rise either from the heat of the reaction or by the application of external heating, to effect a partial polymerization resulting in an appreciable increase in viscosity. The remainder of the aldehyde is then added. While the mixture is still fluid it is appropriately formed to shape, as by molding, and cured under non-evaporating conditions, by the application of heat. As will be apparent from the examples below, this order of mixing is not essential. It is preferred because it provides a means of controlling the condensation through the stepwise addition of aldehyde.

The following examples describe in detail representative products and methods of making them, in accordance with this invention. The examples have been selected for purposes of illustration and are not presented to suggest limitations not previously described and not included in the appended claims.

EXAMPLE 1

| | Parts by weight |
|---|---|
| Resorcinol, USP | 5.50 |
| Diethylenetriamine, B. P. 200–204° C | 5.15 |
| Hydrochloric acid, 12 N | 7.4 |
| Aqueous formaldehyde, 37% USP | 14.7 |

The formaldehyde was added to the diethylene triamine while stirring in a glass container externally cooled, and the hydrochloric acid was then added. The mixture was cooled to 5° C. and the resorcinol in solid form was stirred into the mixture. The cooling was discontinued sufficiently to alow the temperature to rise to 25° C. in a period of about five minutes. During this time the viscosity increased resulting in a syrupy mixture. At this point the liquid was poured into a disk-shaped mold which was then tightly covered. The liquid was allowed to gel in the mold, the temperature rising to 55° C. during this gellation. The molds were then transferred to an oven maintained at 60° C., and kept there for three hours to complete the condensation and cure the membranes thus formed. The membrane, which at this stage was a transparent gel, was finally soaked repeatedly in distilled water to remove water soluble reaction products and excesses of acid.

EXAMPLE 2

| | | |
|---|---|---|
| Resorcinol | grams | 55 |
| Tetraethylene pentamine | cc | 33 |
| Hydrochloric acid, 37% | cc | 59 |
| Formaldehyde, 37% in water | cc | 80 |

Twenty cubic centimeters of the formaldehyde were added to the tetraethylene pentamine while stirring and cooling to maintain a temperature below 30° C. The hydrochloric acid was then added with the temperature maintained at 20–30° C. Twenty more cubic centimeters of formaldehyde were then added and the mixture was cooled to 10° C. The resorcinol was then stirred into the mixture, and the temperature allowed to rise to 45° C. After the mixture cooled to about 20–25° C. (about fifteen minutes) it was cooled further to 10° C. in an ice bath and the rest of the formaldehyde was added. The resulting viscous liquid was cast between two glass plates around a Saran (polyvinylidine chloride) screen. Within ten minutes the clear cast had turned opaque. It was then cured at 65° C. in an oven having an atmosphere saturated with water vapor for three hours. After cooling they were soaked in 1N HCl and finally leached in distilled water.

EXAMPLE 3

Resorcinol _____grams__ 33
Diethylene triamine_____cc__ 16
Hydrochloric acid, 37%_____cc__ 18.9
Formaldehyde, 37% in water_____cc__ 51

Seventeen cubic centimeters of the formaldehyde were added to the diethylene triamine while stirring. After cooling to 30° C. the hydrochloric acid was added and the mixture was immediately cooled to 10° C. The resorcinol was then mixed with the remaining formaldehyde and this mixture was cooled to 10° C. and added to the acid amine formaldehyde mixture. The chilled mixture was then cast between glass plates and cured and further treated as explained in Example 2.

EXAMPLE 4

Phenol _____grams__ 47
Tetraethylene pentamine_____cc__ 33.5
Hydrochloric acid, 37%_____cc__ 93
Formaldehyde, 37% in water_____cc__ 79

Twenty cubic centimeters of formaldehyde were added to the tetraethylene pentamine while stirring and cooling to maintain a temperature below 30° C. The hydrochloric acid was then added with the temperature maintained at 20–30° C. Nineteen more cubic centimeters of formaldehyde were added followed by the addition of the phenol, the temperature then having risen to about 40° C. Thereafter the temperature rose rapidly but was kept below 60° C. After about five minutes the mixture was cooled to between 20 and 25° C. and the remaining formaldehyde was added. The mixture was then cast and further treated as explained in Example 2.

The physical characteristics of the membranes produced in the above examples are set forth in the table. The moisture content was obtained by drying a specimen to constant weight at 105° C., and measuring the loss of weight. The ion exchange capacity was determined by bringing a specimen in equilibrium with a 4 N sodium chloride solution, then leaching repeatedly in distilled water to remove adsorbed sodium chloride, and finally removing all chloride by soaking the membrane repeatedly in 4 N sodium nitrate solutions until equilibrium is reached, and titrating that solution for chloride. The capacity is expressed in the number of milliequivalents of chloride removed by the nitrate per dry gram of material.

The concentration potential was measured in a concentration cell with the membrane separating a 0.60 N sodium chloride solution and a 0.30 N sodium chloride solution, between calomel electrodes connected through saturated KCl salt bridges. The membrane was equilibrated in a 4 N sodium chloride solution, leached in distilled water, and equilibrated in a 0.60N sodium chloride solution prior to insertion in the cell. The respective solutions in the cell were continuously renewed to maintain their concentrations constant. The values recorded in the table are the open circuit potentials after steady conditions were attained. In such a cell the thermodynamically ideal concentration potential is 17 millivolts. It will be seen from the table that this standard was consistently approached.

The electrical conductivity was measured by forming from a leached membrane a strip 10 cm. long and 1 cm. wide, clamping the ends to copper electrodes and measuring the resistance to 60 cycle alternating current. The conductivity is the reciprocal of the resistivity.

Table

| Example | Moisture, percent | Capacity, m. eq./g. | Conc. E. M. F., mv. | Cond., ohm$^{-1}$cm.$^{-1}$ ×10$^3$ |
|---|---|---|---|---|
| 1 | 162 | 4.48 | 16 | 11 |
| 2 | 100 | 3.48 | 14 | 10 |
| 3 | 186 | 4.76 | 14 | 8.7 |
| 4 | 178 | 3.88 | 13 | 18.2 |

Having thus disclosed our invention, we claim as new and desire to secure by Letters Patent:

1. In the method of forming a solid unfractured structure of alkylene polyamine-phenol-aldehyde condensation products having at least two dimensions each in excess of 0.25 inch, and comprising as an essential part extending substantially throughout said structure a predominant amount of anion exchange resin, the step of condensing to the water insoluble infusible stage a water-dispersible reaction product of an alkylene polyamine, a methylol-forming phenol and an aldehyde, while maintained in an aqueous dispersion containing at least 30 per cent of water, based on the weight of condensation product after drying to constant weight at 105° C., under saturated aqueous conditions preventive of substantial evaporation.

2. In the method of forming a solid unfractured structure of alkylene polyamine-phenol-aldehyde condensation products having at least two dimensions each in excess of 0.25 inch, and comprising as an essential part extending substantially throughout said structure a predominant amount of anion exchange resin, the step of condensing to the water insoluble infusible stage a water-dispersible reaction product of an alkylene polyamine, a methylol-forming phenol and an aldehyde in molar ratios of 1.0–2.0 amine group mols per mol of pheenol and 1.2–1.8 mols of aldehyde per mol of phenol plus 0.4–1.0 mols of aldehyde per amine group mol, while maintained in an aqueous dispersion containing at least 30 per cent water, based on the weight of condensation product after drying to constant weight at 105° C., under saturated aqueous conditions preventive of substantial evaporation.

3. In the method of forming a solid unfractured structure of alkylene polyamine-phenol-aldehyde condensation products having at least two dimensions each in excess of 0.25 inch, and comprising as an essential part extending substantially throughout said structure a predominant amount of anion exchange resin, the step of heating to effect condensation to the water insoluble infusible stage a water-dispersible reaction product of an alkylene polyamine, a methylol-forming phenol and an aldehyde and an acid in the molar ratios of 1.0–2.0 amine group mols per mol of phenol, and 1.2–1.8 mols of aldehyde per mol of phenol plus 0.4–1.0 mols of aldehyde per amine group mol, and acid equivalent to 0.5–1.0 mols of hydrochloric acid under amine group mol, in water, while maintained under conditions preventive of substantial evaporation of water, there being present throughout said condensation at least 30 per cent of water, based on the weight of condensation product after drying to constant weight at 105° C.

4. In the method of forming a solid unfractured structure of alkylene polyamine-resorcinol-formaldehyde condensation products having at least two dimensions each in excess of 0.25 inch, and comprising as an essential part extending substantially throughout said structure a predominant amount of anion exchange resin, the step of heating to effect condensation to the water insoluble infusible stage a water dispersible reaction product of an alkylene polyamine, resorcinol and formaldehyde and an acid in the molar ratios of 1.0–2.0 amine group mols per mol of resorcinol, and 1.2–1.8 mols of formaldehyde per mol of resorcinol plus 0.4–1.0 mols of formaldehyde per amine group mol, and acid equivalent to 0.5–1.0 mols of hydrochloric acid per amine group mol, in water, while maintained under conditions preventive of substantial evaporation of water, there being present throughout said condensation at least 30 per cent of water, based on the weight of condensation product after drying to constant weight at 105° C.

5. In the method of forming a solid unfractured structure of alkylene polyamine-resorcinol-formaldehyde condensation products having at least two dimensions each in excess of 0.25 inch, and comprising as an essential part extending substantially throughout said structure a predominant amount of anion exchange resin, the step of heating to effect condensation to the water insoluble infusible stage a water-dispersible reaction product of a material selected from the group consisting of ethylene diamine and the polyethylene polyamines, resorcinol and formaldehyde and an acid in the molar rations of 1.0–2.0 amine group mols per mol of resorcinol, and 1.2–1.8 mols of formaldehyde per mol of resorcinol plus 0.4–1.0 mols of formaldehyde per amine group mol, and acid equivalent to 0.5–1.0 mols of hydrochloric acid per amine group mol, in water, while maintained under conditions preventive of substantial evaporation of water, there being present throughout said condensation at least 30 per cent of water, based on the weight of condensation product after drying to constant weight at 105° C.

6. In the method of forming a solid unfractured structure of alkylene polyamine-phenol-aldehyde condensation products having at least two dimensions each in excess of 0.25 inch, and comprising as an essential part extending substantially throughout said structure a predominant amount of anion exchange resin, the step of condensing to the water insoluble infusible stage material selected from the group consisting of ethylene diamine and the polyethylene polyamines, a methylol-forming phenol and an aldehyde, while maintained in an aqueous dispersion containing at least 30 per cent of water, based on the weight of condensation product after drying to constant weight at 105° C., under saturated aqueous conditions preventive of substantial evaporation.

7. As an article of manufacture, a solid unfractured structure having at least two dimensions in excess of 0.25 inch, and comprising as an essential part extending throughout said structure a predominant amount of an anion exchange resin comprising a water insoluble, infusible condensation polymer of a methylol-forming phenol, an alkylene polyamine and an aldehyde, in gel relationship with at least 30 per cent water, based on the weight of condensation polymer after drying to constant weight at 105° C., said water presenting a continuous phase throughout said gel.

8. As an article of manufacture, a solid unfractured structure having at least two dimensions in excess of 0.25 inch and having an electrical conductivity in excess of $5 \times 10^{-3} ohm^{-1} cm^{-1}$ and comprising as an essential part extending substantially throughout said structure a predominant amount of an anion exchange resin comprising a water insoluble, infusible condensation polymer of a methylol-forming phenol, alkylene polyamine and an aldehyde, combined in the molar ratios 1.0–2.0 amine group mols per mol of phenol, and 1.2–1.8 mols of aldehyde per mol of phenol plus 0.4–1.0 mols of aldehyde per amine group mol, in gel relationship with at least 30 per cent water, based on the weight of condensation polymer after drying to constant weight at 105° C., said water presenting a continuous phase throughout said gel.

9. As an article of manufacture, a solid unfractured membrane having at least two dimensions in excess of 0.25 inch and having an electrical conductivity in excess of $5 \times 10^{-3} ohm^{-1} cm^{-1}$ and comprising as an essential part extending substantially throughout said membrane a predominant amount of an anion exchange resin comprising a water insoluble, infusible condensation polymer of resorcinol, an alkylene polyamine and formaldehyde, combined in the molar ratios of 1.0–2.0 amine group mols per mol of phenol, and 1.2–1.8 mols of formaldehyde per mol of phenol plus 0.4–1.0 mols of formaldehyde per amine group mol, in gel relationship with at least 30 per cent water, based on the weight of condensation polymer after drying to constant weight at 105° C., said water presenting a continuous phase throughout said gel.

10. As an article of manufacture, a solid unfractured structure having at least two dimensions in excess of 0.25 inch and having an electrical conductivity in excess of $5 \times 10^{-3} ohm^{-1} cm^{-1}$ and comprising as an essential part extending substantially throughout said structure a predominant amount of an anion exchange resin comprising a water insoluble, infusible condensation polymer of a methylol-forming phenol, material selected from the group consisting of ethylene diamine and the polyethylene polyamines and an aldehyde, combined in the molar ratios 1.0–2.0 amine group mols per mol of phenol, and 1.2–1.8 mols of aldehyde per mol of phenol plus 0.4–1.0 mols of aldehyde per amine group mol, in gel relationship with at least 30 per cent water, based on the weight of condensation polymer after drying to constant weight at 105° C., said water presenting a continuous phase throughout said gel.

References Cited in the file of this patent

UNITED STATES PATENTS

| 2,402,384 | Eastes | June 18, 1946 |
| 2,546,938 | Bauman et al. | Mar. 27, 1951 |
| 2,581,035 | Martin et al. | Jan. 1, 1952 |
| 2,636,851 | Juda et al. | Apr. 28, 1953 |

FOREIGN PATENTS

| 713,093 | Germany | Oct. 9, 1941 |

OTHER REFERENCES

Nachod: "Ion Exchange," pp. 49, 50, 62–67, pub. 1949 by Interscience Pub., New York.

Ramondt: article in "Chemistry and Industry," September 6, 1947, pages 543–545.